United States Patent
Forgue et al.

(10) Patent No.: US 8,465,258 B2
(45) Date of Patent: Jun. 18, 2013

(54) PLATFORM SEAL IN A TURBOMACHINE ROTOR, METHOD FOR IMPROVING THE SEAL BETWEEN A PLATFORM AND A TURBOMACHINE BLADE

(75) Inventors: Jean-Bernard Forgue, Montacher-Villegardin (FR); Patrick Jean-Louis Reghezza, Vaux le Penil (FR); Carole Stochmil, Corbeil Essonnes (FR)

(73) Assignee: SNECMA, Paris (FR)

( * ) Notice: Subject to any disclaimer, the term of this patent is extended or adjusted under 35 U.S.C. 154(b) by 858 days.

(21) Appl. No.: 12/636,235

(22) Filed: Dec. 11, 2009

(65) Prior Publication Data

US 2010/0150724 A1 Jun. 17, 2010

(30) Foreign Application Priority Data

Dec. 12, 2008 (FR) ...................... 08 58525

(51) Int. Cl.
*F01D 5/26* (2006.01)
*B64C 11/04* (2006.01)

(52) U.S. Cl.
USPC .................... 416/193 R; 416/193 A; 416/500

(58) Field of Classification Search
USPC .................. 415/193 A, 193 R, 190, 194, 500, 415/196 R; 277/644, 647; 416/193 A, 193 R, 416/190, 194, 500, 196 R
See application file for complete search history.

(56) References Cited

U.S. PATENT DOCUMENTS

| | | | |
|---|---|---|---|
| 4,183,720 A | 1/1980 | Brantley | |
| 4,580,946 A | 4/1986 | Bobo | |
| 6,634,863 B1 | 10/2003 | Forrester et al. | |
| 2003/0049129 A1 | 3/2003 | Scott et al. | |
| 2005/0178168 A1 * | 8/2005 | Kim et al. ........................ 68/23.1 |
| 2007/0280830 A1 * | 12/2007 | Mulcaire et al. ........... 416/193 R |
| 2009/0165505 A1 * | 7/2009 | Bobed ............................ 68/139 |

FOREIGN PATENT DOCUMENTS

| | | | |
|---|---|---|---|
| EP | 0 787 890 A2 | 8/1997 | |
| EP | 1 067 274 A1 | 1/2001 | |
| EP | 1067274 A1 * | 1/2001 | |
| EP | 1 865 154 A1 | 12/2007 | |

OTHER PUBLICATIONS

U.S. Appl. No. 13/265,200, filed Oct. 19, 2011, Rechezza, et al.
U.S. Appl. No. 13/139,456, filed Jun. 13, 2011, Forgue, et al.

* cited by examiner

*Primary Examiner* — Edward Look
*Assistant Examiner* — William Grigos
(74) *Attorney, Agent, or Firm* — Oblon, Spivak, McClelland, Maier & Neustadt, L.L.P.

(57) ABSTRACT

An elastomer material seal for an interleaved platform between two adjacent blades in a turbomachine rotor is disclosed. The seal is of elongate shape and includes transversely a contact part, an attachment part, and a flexible part between the attachment part and the contact part. The seal is noteworthy in that it further includes a local reinforcement of the flexible part, to avoid the tearing that would result from centrifugal forces on the seal. The local reinforcement of the flexible part includes at least one transverse rib on the flexible part.

10 Claims, 2 Drawing Sheets

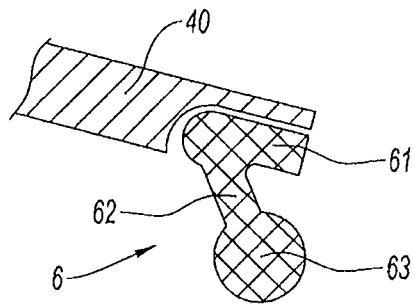
Fig. 3
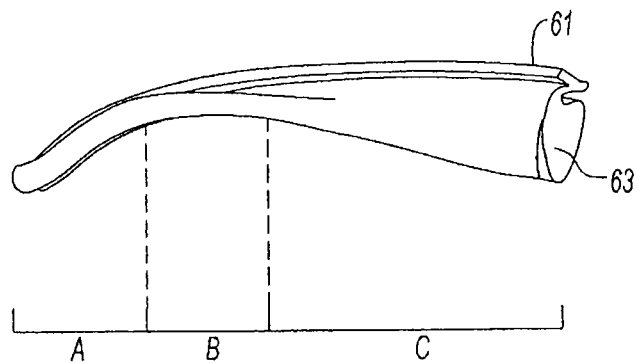
Fig. 4
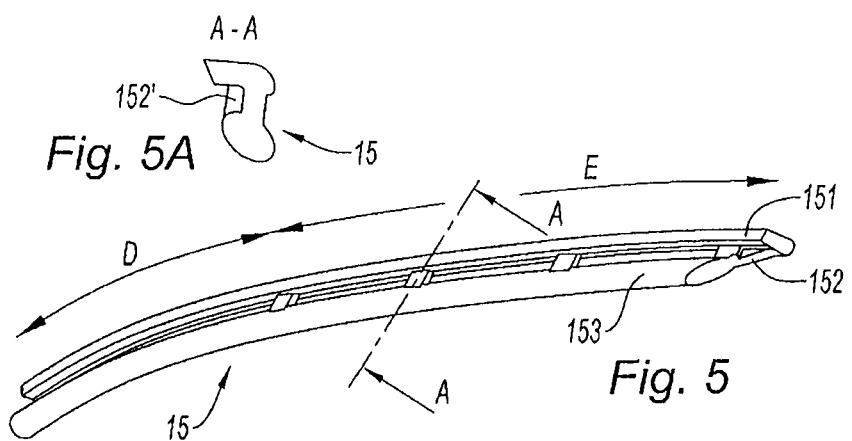
Fig. 5A
Fig. 5

PLATFORM SEAL IN A TURBOMACHINE ROTOR, METHOD FOR IMPROVING THE SEAL BETWEEN A PLATFORM AND A TURBOMACHINE BLADE

BACKGROUND OF THE INVENTION

The present invention concerns the field of multiflow, in particular double-flow, jet engines and more generally that of turbomachines.

A double-flow jet engine comprises a gas turbine engine through which flows a flow of gas referred to as the primary flow driving a fan delivering a flow of air referred to as the secondary flow. When the fan is placed at the front of the engine, it discharges aspirated air that is separated into two concentric flows: one the primary flow, the other the secondary flow. The air of the primary flow is compressed again and then mixed with fuel in a combustion chamber to produce a high-energy gas flow that drives the downstream turbines. One of the turbines is connected by a shaft to the fan rotor, which it drives. The secondary flow in civil aircraft engines provides most of the thrust of the engine and the fan is consequently of very large diameter.

The fan rotor comprises a wheel the hub of which is fastened to the drive shaft and the rim of which comprises substantially axially oriented cells. The axial direction is that of the engine shaft. The blades have their root engaged in the individual cells, and form the fan rotor. A fan blade comprises a root, an airfoil of aerodynamic profile and a root shank between the root and the blade. To constitute the boundary surface between the rim of the rotor and the airstream and to ensure continuity of the primary flow, platforms are interleaved between the blades. Differing from the higher compression stages and because of the large dimensions of the blades, the platforms of the fan rotor are separate parts rather than integral with the blades. Note that the inside radius of the airstream increases significantly between the inlet and the outlet of the fan rotor.

Clearance is provided between the platforms and the blades to allow limited relative movement of the blades during the various phases of operation of the engine. This clearance is plugged by an elastomer material seal fixed along the lateral edges of the platform and bearing against the adjacent blade.

DESCRIPTION OF THE PRIOR ART

In the prior art, the seal is of elongate shape and has a constant profile from one end to the other. In the transverse direction, it is made up of three parts: a part attaching it to the platform, a flexible part, and an enlarged part conformed to ensure contact with the adjacent surface. The flexible part allows adaptation of the seal to the distance separating the edge of the platform from the facing surface of the blade.

It is found that after a certain service life of the turbomachine to which they are fitted, they have rupture zones. There follows a loss of seal at the fan blade root. A poor seal impacts on the flow rate and the efficiency of the compressor stages directly downstream of the fan. It also impacts on the pumping margin.

The seals are therefore parts that it is necessary to replace regularly during the service life of the turbomachine to ensure optimum operation thereof.

SUMMARY OF THE INVENTION

An object of the present invention is to improve the production of the seal between the blades and the platforms of a turbomachine rotor with free interleaved platforms with the aim of reducing the frequency of replacement of the seals.

The seals break because of stresses resulting from deformations caused by circumferential and axial relative movements between the platforms and the blades during the various operating phases of the turbomachine.

The objective of the applicant is to modify only the seal, without intervention on the parts of the rotor.

Observing torn seals shows a tendency to twisting in the part of the seal situated downstream on the platform. This twisting causes high deformation in a transition zone with the untwisted part of the seal. This zone is then the seat of stresses that are liable to lead to it breaking locally. Analysis shows that one source of this deformation could be the position of the seals in space—they are not oriented parallel to the engine axis but strongly inclined to follow the increase in the radius of the platform in the upstream to downstream direction—the stresses to which the seals are subjected are not uniform over their length. Centrifugal forces are therefore higher on the downstream part than on the upstream part and generate different deformations between the upstream and downstream parts. This effect is strengthened by a clearance between the platform and the surface of the blade that is not constant from the upstream end to the downstream end. The clearance reduces in the downstream direction and the enlarged part of the seal is therefore, at the circumference, pushed toward the interior of the platform. Thus it has been found that the downstream part of the seal is liable to be pressed against the platform.

Thus the invention succeeds in alleviating these drawbacks by means of a seal for an interleaved platform between two adjacent blades in a turbomachine rotor, of elongate shape between an upstream edge and a downstream edge, comprising transversely, in the widthwise direction a contact part, an attachment part, and a flexible part between the attachment part and the contact part.

The seal is noteworthy in that it comprises a local reinforcement of the flexible part, to avoid the tearing that would result from centrifugal forces on the seal, the means forming the local reinforcement of the flexible part comprising at least one transverse rib on the flexible part.

The solution of the invention thus consists in providing means for reducing the impact of centrifugal forces on the seal during operation of the turbomachine.

More particularly, the rib is disposed in the zone of the seal liable to be deformed by twisting.

The strength of the seal is further increased by chamfering at least one edge. The chamfer consists of a bevel cut the seal.

The invention relates also to a turbomachine rotor interleaved platform comprising such a seal at least along a lateral longitudinal edge.

The platform is adapted to be mounted on a jet engine fan rotor.

In one particular embodiment, the platform is adapted to be mounted on a rotor so as to have a diameter at one axial end of the rotor greater than that at the other end. The platform is provided with a seal the smallest section of which is at the larger diameter end.

The invention relates also to a turbomachine rotor including said interleaved platforms and more particularly a jet engine fan rotor.

The invention relates also to a method for improving the seal between a platform and a blade of a turbomachine rotor provided by a seal of elongate shape extending in the upstream to downstream direction and comprising transversely, in the widthwise direction, a contact portion, an attachment portion, and a flexible portion between the attachment portion and the contact portion. It is noteworthy in that it consists in determining between the upstream edge and the downstream edge a zone of maximum deformation of the seal and in modifying the seal to reduce deformation in said downstream zone.

The seal of one embodiment is modified by a reinforcement in the zone situated downstream of the maximum deformation zone. In particular the seal is reinforced by at least one transverse rib in the flexible part or by means of a core stiffening the entire seal.

In another embodiment the seal is modified by making it more flexible with a cut-out in the maximum deformation area.

DESCRIPTION OF THE DRAWINGS

One embodiment of the invention is described hereinafter by way of nonlimiting example and with reference to the drawings, in which:

FIG. 3 represents a section of the seal taken along the section line III-III in FIG. 2.

FIG. 4 shows a simulation of the possible deformation of the prior art seal.

FIG. 5 shows in perspective a seal of the invention with local reinforcement.

FIG. 5A is a view of the seal from FIG. 5 in section taken along the line AA.

FIG. 1 is a partial perspective view of the components of a double-flow engine fan rotor. The disk 1 has on its rim 10 cells 11, of which there are five in the figure, oriented substantially axially relative to the axis XX of the engine. The cells are of dovetail section with longitudinal edges facing the axis XX. The blades are slid into the cells via an open end. A single blade 2 is represented in position for introduction into the cell. The blade 2 comprises a root 21, a root shank 22 and an airfoil 20. The root 21 is conformed to be lodged in a cell 11, with lateral enlargements through which it presses in a radially outward direction against the longitudinal edges of the cell facing the axis XX. The root is held in bearing engagement by shims 3 that are slid along the bottom of the cell 11 under the root 21 during assembly. The device for retaining the blades on the disk further includes means, not represented here, for axially locking the blades individually relative to the disk.

Figure 1:
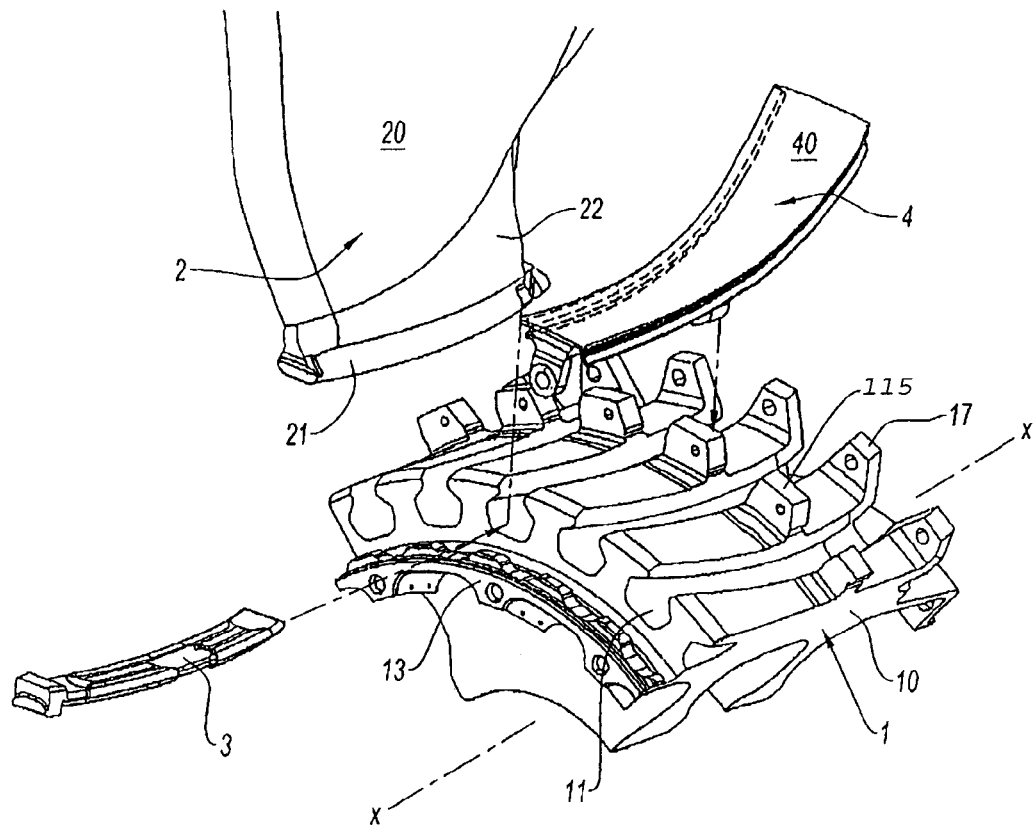
FIG. 1 shows a perspective view of part of a double-flow jet engine fan rotor.
Figure 2:
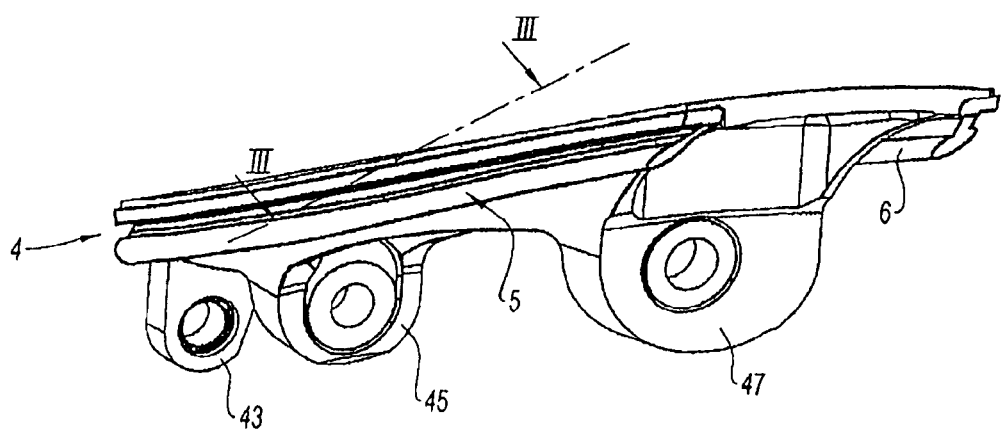
FIG. 2 shows a perspective view of a platform with lateral seals.

The fan blades do not include integral platforms, unlike other compressor blades of the turbomachine. This function is provided by interleaved platforms that are partly free to move relative to the blades. A platform 4 is represented in FIG. 1. The rotor comprises as many platforms as blades. They are disposed between two adjacent blades. A platform 4 comprises a plate 40 of substantially frustoconical shape delimiting the radially interior surface part of the primary air stream guided between two adjacent blades. It is retained on the disk at three points and includes three radial tongues clearly visible in FIG. 2. The upstream tongue 43 is pierced axially and fixed by a key that is not represented to an upstream flange 13 on the upstream face of the disk. An intermediate, also radial, tongue 45 is retained by a key that is not represented to a radial tongue 115 positioned on the rim of the disk between two cells. The third tongue 47 retains the plate 40 at the downstream end on the radial tongue 17 by which the disk is fixed to the drum of the immediately downstream compressor, usually referred to as the "booster" and not represented here. The keys are oriented along the axis XX and retain the platform both axially and radially.

To provide the seal between the airstream and the interior volume of the rotor, elastomer material seals 5 and 6 are disposed along the platforms. A seal is shown in FIG. 3 which is a cross section taken along the line III-III. The seal 6 is in three parts: an attachment part 61, a flexible connecting part 62, and a contact part 63. The seal is fastened to the platform by bonding the attachment part 61 into a groove formed along the lateral edge of the plate 40 forming the platform. The contact part is preferably of enlarged section, preferably oval or circular. Its shape assures good tangential contact with the adjacent part, but also stiffens the seal and confers inertia on it for satisfactory bearing engagement. The connecting part 62 is narrower than the contact part and is flexible to enable the seal to adapt. As seen in FIG. 3, the contact part extends beyond the edge of the platform to come into contact with the adjacent surface of the blade.

If the seal is of constant shape over its whole length, it is seen that it is not deformed homogeneously. The deformations create stresses that generate breaks that compromise the seal.

FIG. 4 represents a simulation of the deformations that the seal is liable to undergo in operation. Three zones can be distinguished. A first zone A is situated on the upstream part of the platform, where the shape of the seal corresponds to that expected when it is in place on the platform and in external bearing engagement against the root shank of the adjacent blade. In the zone C, the seal is twisted; the contact part 63 is bent over against the platform instead of being in exterior bearing engagement. This undesirable position is caused by centrifugal forces combined with lateral forces exerted by the root shank. The intermediate zone B between the zones A and C is subjected to maximum deformation and is the seat of the breaks.

FIG. 5 shows, lengthwise and in section, first means consisting in locally reinforcing the flexible part of the seal.

DESCRIPTION OF THE PREFERRED EMBODIMENT

As in the prior art, the seal 15 has a section in three parts from one end to the other. It comprises an attachment part, a flexible part and a contact part.

There are distinguished in the lengthwise direction the upstream end and the downstream end; the terms upstream and downstream relate to the edges of the platform on which the seal is intended to be placed. Between these two edges the seal comprises two zones D and E. In the upstream zone D, the profile is not modified compared to the prior art, with an attachment part 151 to be glued into the corresponding groove of the platform, a flexible part 152, and a contact part 153 of circular shape here.

The length of the zone D is substantially between half and two-thirds of the length of the seal.

In the downstream zone E, the flexible part of the seal has been stiffened by at least one rib disposed crosswise, here four regularly distributed ribs. The section A-A of the seal shows that the attachment part 151 is connected to the contact part 153 by the flexible part 152 reinforced by a rib 152'. The contact part 153 is not modified relative to the upstream zone. By this reinforcement 152' the forces tending to twisting of the seal in this zone E. On carrying out tests with the seal modified in this way, no deformation compromising the integrity of the seal was found.

To reduce the risks of onset of breaking, the connecting zone between the flexible part 152 and the contact part 153 is preferably rounded and has no sharp edges.

The solution of the invention consists in changing the profile of the seal to take account of the non-uniformity of the forces to which it is subjected.

The connection zone between the flexible part and the contact part is preferably rounded to reduce the risks of onset of breaking.

An embodiment has been described corresponding to the case of a double-flow jet engine fan rotor. In this case, the inside radius of the primary airstream varies greatly between its entry and exit. Moreover, the clearance between the platform and the blade is not constant either, reducing between the upstream and downstream ends.

The invention applies more generally to any turbomachine having a similar configuration.

The invention claimed is:

1. An elastomer material seal for an interleaved platform between two adjacent blades in a turbomachine rotor, of elongate shape with an upstream edge and a downstream edge, the seal including an upstream zone and a downstream zone between the upstream and downstream edges, the seal comprising transversely, in the widthwise direction:
    a contact part which is circular or oval;
    an attachment part;
    a flexible part between the attachment part and the contact part, the flexible part being narrower than the contact part; and
    a local reinforcement of the flexible part disposed only in the downstream zone of the seal,
    wherein the local reinforcement of the flexible part includes at least one transverse rib on the flexible part disposed only in the downstream zone of the seal, and
    wherein the upstream zone extends substantially between one half to two-thirds of a length of the seal from the upstream edge.

2. The seal as claimed in claim 1, wherein the rib is disposed in a zone of the seal liable to be deformed by twisting.

3. The seal as claimed in claim 1, wherein the seal forms a lip.

4. The seal as claimed in claim 1, wherein at least one edge of the seal is chamfered.

5. A turbomachine rotor interleaved platform comprising a seal as claimed in claim 1 disposed at least along a lateral longitudinal edge.

6. The platform as claimed in claim 5 which is mounted on a jet engine fan rotor.

7. A turbomachine rotor including interleaved platforms as claimed in claim 5.

8. A method for improving the seal between a platform and a blade of a turbomachine rotor provided by a seal of elongate shape extending in an upstream to downstream direction so as to present an upstream zone and a downstream zone between an upstream edge and a downstream edge, and comprising transversely, in the widthwise direction, a contact portion which is circular or oval, an attachment portion, and a flexible portion between the attachment portion and the contact portion, the method comprising:
    determining between the upstream edge and the downstream edge a zone of maximum deformation of the seal when the turbomachine is operating; and
    reinforcing the seal to reduce deformation in the zone situated downstream of the zone of maximum deformation by providing at least one transverse rib in the flexible part only in the zone situated downstream of the zone of maximum deformation.

9. The seal as claimed in claim 1, wherein a connection zone between the flexible part and the contact part is rounded.

10. The platform as claimed in claim 5, wherein the seal is glued into a corresponding groove of the platform.

\* \* \* \* \*